US006276621B1

(12) United States Patent
Henry

(10) Patent No.: US 6,276,621 B1
(45) Date of Patent: Aug. 21, 2001

(54) CUTTER MODULE WITH AN INTEGRATED TRIM DISPOSAL MECHANISM

(75) Inventor: Bradford D. Henry, Cary, NC (US)

(73) Assignee: Bell & Howell Mail and Messaging Technologies Company, Durham, NC (US)

( * ) Notice: Subject to any disclaimer, the term of this patent is extended or adjusted under 35 U.S.C. 154(b) by 0 days.

(21) Appl. No.: 09/448,532

(22) Filed: Nov. 22, 1999

(51) Int. Cl.[7] .................................................... B02C 18/22

(52) U.S. Cl. ......................... 241/60; 241/100; 241/101.2; 241/101.4

(58) Field of Search ............................. 241/100, 60, 242, 241/101.2, 101.4, 236

(56) References Cited

U.S. PATENT DOCUMENTS 4,572,496 2/1986 Casper et al. .
4,878,626 11/1989 Leuthold et al. .................... 241/236
5,036,739 8/1991 Clar .
5,235,882 8/1993 Rabourn .
5,322,232 6/1994 Freeman et al. .
5,628,864 5/1997 Kataigi et al. .
5,826,474 10/1998 Howard et al. .

OTHER PUBLICATIONS

Precision Cutters, Inc., "The ABC's of Trim & Filament "In–Line" Cutting Systems".
Precision Cutters, Inc., "Product Brochure".

*Primary Examiner*—Mark Rosenbaum
(74) *Attorney, Agent, or Firm*—Jenkins & Wilson, P.A.

(57) ABSTRACT

A cutter module with an integrated trim disposal mechanism is disclosed. The integrated trim disposal mechanism results in the lack of need for using large expensive external trim disposal devices. The trim disposal mechanism chops the trim into small pieces that are easily collected in a trim fragment collection receptacle. A full trim fragment collection receptacle can either be emptied and reused or discarded and replaced with a new empty trim fragment collection receptacle.

13 Claims, 1 Drawing Sheet

CUTTER MODULE WITH AN INTEGRATED TRIM DISPOSAL MECHANISM

TECHNICAL FIELD

The present invention relates generally to paper processing and mail processing, and more particularly to a cutter module with an integrated trim disposal mechanism.

BACKGROUND ART

The use of continuously fed form-feed material remains extensive. An example of a typical application of such material is depicted in U.S. Pat. No. 5,826,474, issued on Oct. 27, 1998, to Pitney Bowes. As described in the '474 patent, a continuous web of paper having a pair of perforated margin strips is provided. Each of the margin strips includes a plurality of linearly, uniformly spaced apertures which engage the pins of a pair of toothed timing belts or the like. The belts then feed the web past a pair of conventional, stationary, slitter knives and cooperating rollers. The slitter knives cause the margin strips to be severed from the web. The severed margin strips are commonly called "trim".

After being created, trim must be disposed of. While the '474 patent discloses a method of deflecting trim away from the area where it could create jam, the '474 patent does not disclose any method of actually disposing of the trim.

To date, the most widely used method of trim disposal uses a large trim removal device such as the one shown in U.S. Pat. No. 5,332,232, issued Jun. 21, 1994, to Moore Business Forms. This device is not only costly from a purchasing price standpoint but also external to the device creating the trim, e.g., cutter. Accordingly, it consumes valuable resources and floor space that can be used for more productive purposes.

Similarly, Precision Cutters, Inc. (PCI) of Phillipsburg, N.J. (www.precisioncutters.com) makes and sells an external trim disposal system. Accordingly, it faces many of the same problems posed by the system described in U.S. Pat. No. 5,322,232, to Moore Business Systems.

Despite the existence of prior art apparatuses, there is room for improvement within the art.

DISCLOSURE OF THE INVENTION

It is an object of the present invention to provide a novel trim disposal apparatus.

It is another object of the present invention to provide a trim disposal apparatus that takes up minimal additional floor space.

It is a further object of the present invention to provide a trim disposal apparatus that turns trim into low volume end products that can be easily disposed of in a simple receptacle.

It is a still further object of the present invention to provide trim disposal apparatus that is integrated into a trim generating device, e.g., a cutter module.

These and other objects of the invention are met in whole or in part by a cutter module with integrated trim disposal mechanism, comprising: a cutter housing; cutter blades contained within the housing; a trim disposal mechanism also contained within the housing and comprising: a trim disposal path contained within the housing, the entrance to the trim disposal path being adjacent the cutting blades and the exit to the trim disposal path being distant from the cutting blades; a trim transport sub-assembly for drawing trim from the entrance to the trim disposal path to the exit to the trim disposal path; and a trim fragment collector, the trim fragment collector being positioned downstream of the exit to the trim disposal path.

DETAILED DESCRIPTION OF THE INVENTION

Figure 1:
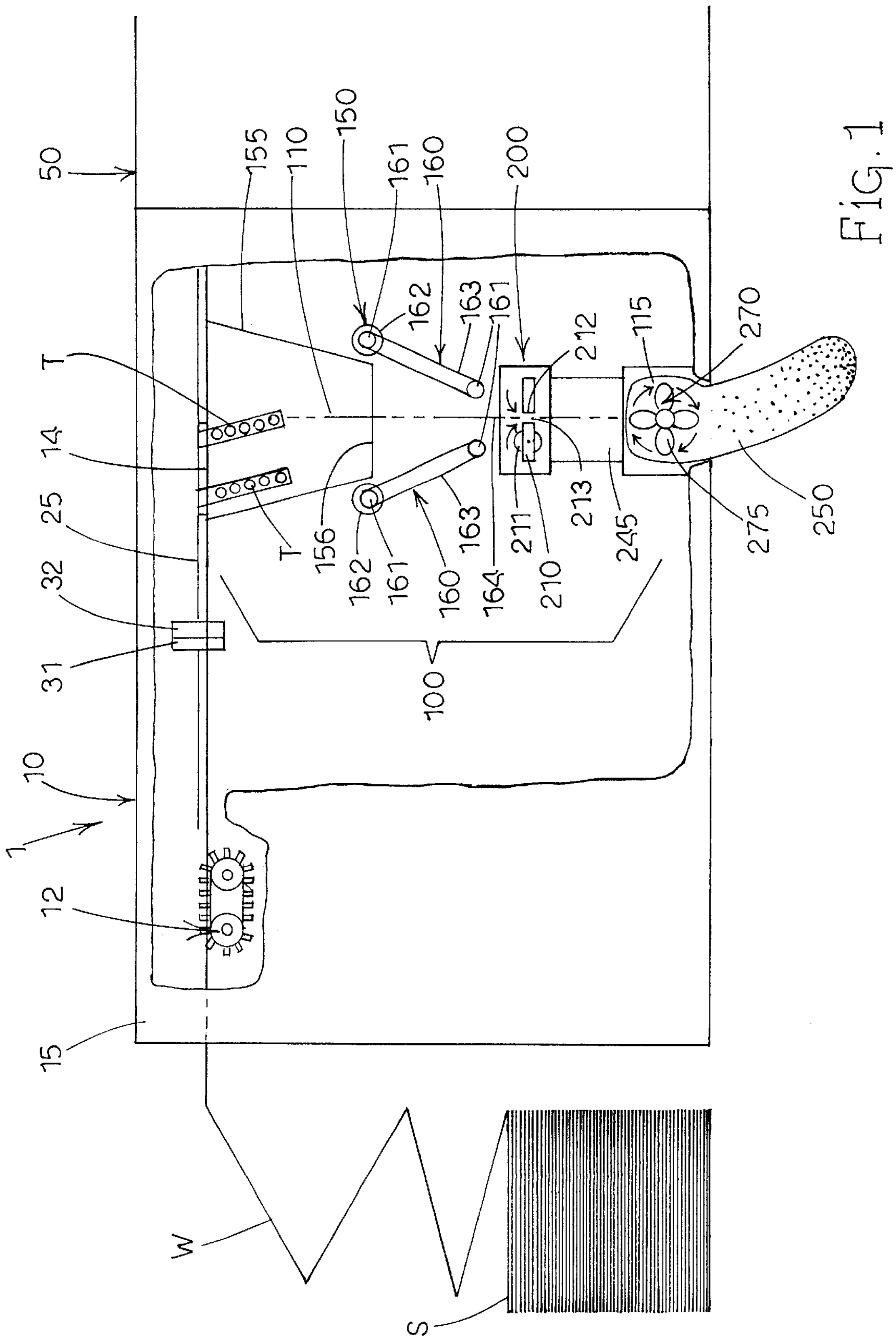
FIG. 1 of the drawings is an elevational cutaway view of a web feeding system employing a cutter module with integrated trim disposal mechanism according to the invention.

With reference to the above-mentioned drawing, a cutter module with integrated trim disposal mechanism that meets and achieves, in whole or in part, the various objects of the invention set forth above will now be described.

FIG. 1 is a cutaway elevation view of a web-feeding device generally designated according to the invention. Web-feeding device 1 typically comprises two sections, namely: feeder/cutter/slitter module generally designated 10, downstream operations module generally designated 50, in the form of, for example, a staging device or turn-over sequencer as depicted in U.S. Pat. Nos. 5,362,039 and 5,439,108.

Feeder/cutter/slitter module 10, is depicted in FIG. 1 as including a conventional motor-driven tractor-feed mechanism 12 contained within housing 15 for feeding fan-fold web material W found in stack S beside module 10. Web W comprises standard pin-feed stock such as described in the background of the invention above. Examples of conventional motor-driven tractor-feed mechanisms can be found in U.S. Pat. Nos. 5,036,739; 5,235,882; 5,628,864; and 5,826,474.

In most pin-feed applications, the perforated margin strips are turned into trim in feeder/cutter/slitter module 10. Margin strips are unattractive and would cause the sheets that they are attached to have an irregular size if not removed. Accordingly, the perforated margin strips are turned into "trim" and removed. To date, typically trim is disposed of using the large trim removal system shown in U.S. Pat. No. 5,322,232, and assigned to Moore Business Forms, Inc. This large stand-alone device not only takes up valuable floor space in the work environment, but carries a large cost in dollars. Finally, the device shown in U.S. Pat. No. 5,322,232, results in a large roll of trim (see FIG. 7 of U.S. Pat. No. 5,322,232) that needs to be removed from the device and then disposed of. These strips require additional manpower.

The instant invention integrates a trim disposal system primarily inside feeder/cutter/slitter module 10, thereby entirely eliminating the need for the large device depicted in U.S. Pat. No. 5,322,232 and reducing the trim to very small particles that can easily be disposed of in a small receptacle of some type.

Positioned immediately downstream of the cutter blades 31, 32, adjacent thereto, and contained within housing 15 of cutter-slitter module 10 is a trim disposal system generally designated 100 for gathering, collecting, compressing, and chopping trim into smaller particles that can be easily collected.

Trim disposal system 100 includes a vertically oriented trim disposal path 110 having an entrance 14 in feed plate 25 and an exit 115 that typically includes a hole in housing 15. A trim collector, in the form of trim collection receptacle 250, is positioned in communication with exit 115 to trim disposal path 110. While in FIG. 1, trim collection receptacle 250 is depicted as being on the outside of housing 15, this is for illustration purposes only, as trim collection receptacle 250 can be inside housing 15 during actual use of web feeding device 1 if space permits. In such situations, it might be possible for exit 115 to not include any hole in housing 15.

In the prior art, as described in U.S. Pat. No. 5,826,474, a pair of rollers are typically used to guide the severed trim strip down and away from remaining individual sheet. The instant invention assumes that trim is deflected downward as in the prior art and the details of how that is achieved plays no part in the present invention.

Trim transport sub-assembly generally designated 150 is used to gather, collect, and compress downwardly guided trim T entering trim disposal path 110 via entrance 14. Trim collection channel 155, typically having a funnel-like structure, directs trim T towards a central trim collection channel exit location 156 as trim T is guided downward by a prior art trim deflector (not shown) and the effects of gravity.

At central trim collection channel exit location 156, a suitable positive drive mechanism generally designated 160 is positioned to positively act upon trim T and draw (pull) it further into the trim disposal path 110. The positive drive mechanism can include a pair of opposed counter-rotating conveyor belts 163 wrapped around pulleys 161 and driven by a mechanical or electro mechanical drives 162. Belts 163 are driven so that the runs of belts 163 that face trim disposal path 110 are rotating in the downward direction so as to contact trim T and draw (pull) it further down trim disposal path 110. Conveyor belts 163 are preferably positioned in a v-like configuration to cause a pinch point 164 at which the trim is held and through which the trim is extruded into a trim chopping mechanism generally designated 200 described immediately below. If the trim is not held at pinch point 164, the trim will be merely pulled through trim chopping mechanism 200 and not cut into small pieces.

Positioned below and downstream of conveyor belts 163 is trim chopping mechanism 200. Trim chopping mechanism 200 takes trim T delivered thereto by positive drive mechanism 160 reduces it into a form that is of less volume and difficulty to dispose. One contemplated embodiment of trim chopping mechanism 200 can comprise one rotating blade 210 driven by a suitable motor 211 and positioned a short distance away from stationary pinch point 212 to form a gap 213 through which trim passes. Passing trim T through the small gap between rotating blade 210, being rotated at a very high speed or cyclic rate, and stationary pinch point 212 will result in trim being reducing to very small fragments. A very fast rotating blade 210 can cut the same piece of trim T multiple times, thereby reducing it to very small fragments. This is the preferred method of operation of the instant invention.

Negative air pressure source 270 sucks trim fragments through the remainder of trim disposal path 110 and trim fragments collection tube 245 and then exhausts the trim fragments towards trim fragment collector 250. Negative pressure source 270 is typically in the form of a fan 275. Trim fragments exhausted by negative pressure source 270 flow towards exit 115 and then into trim fragment collecting receptacle 250.

As trim fragment collecting receptacle 250 becomes full, it is easy to just remove the receptacle, typically in the form of some kind of flexible bag, and either dispose of the receptacle and its contents and replace it with a new receptacle or just empty and then replace the receptacle. Note that as regards the latter approach, the receptacle could be connected to the conventional central vacuum system of the facility in which it is placed, and the central vacuum system would empty the receptacle and dispose of the trim fragments. In the possible situation where receptacle 250 is positioned inside housing 15, typically in the form of cover panels, the cover panels will have to be removed and then replaced to change receptacle 250.

In any event, unlike the roll of waste trim described in FIG. 7 of U.S. Pat. No. 5,322,232, a complex series of steps and special stand alone apparatus are not required to dispose of the trim when using the instant invention.

The above description is given with reference to a cutter with integrated trim disposal apparatus. However, it will be understood that various details of the invention can be changed without departing from the scope of the invention. Furthermore, the foregoing description is for purpose of illustration only, and not for purpose of limitation, as the invention is defined by the following, appended claims.

What is claimed is:

1. A cutter module with an integrated trim disposal mechanism, comprising:

(a) a cutter housing;

(b) cutter blades contained within said housing;

(c) a trim disposal mechanism also contained within said housing and comprising:

(i) a trim disposal path contained within said housing, the entrance of said trim disposal path being adjacent said cutting blades and the exit of said trim disposal path being distant from said cutting blades;

(ii) a trim transport sub-assembly for drawing trim from said entrance of said trim disposal path to said exit of said trim disposal path, said trim transport sub-assembly including a positive drive mechanism positioned between said entrance of said trim disposal path and said exit of said trim disposal path; and (iii) a trim fragment collector, said trim fragment collector being positioned downstream of said exit of said trim disposal path.

2. The cutter module with an integrated trim disposal mechanism according to claim 1, wherein said trim disposal path is substantially vertical and said entrance of said trim disposal path is positioned above said exit of said trim disposal path.

3. The cutter module with an integrated trim disposal mechanism according to claim 1, wherein said positive drive mechanism comprises opposed driven belt conveyors positioned in a v-configuration.

4. The cutter module with an integrated trim disposal mechanism according to claim 1, further comprising a trim chopping mechanism positioned downstream of said positive drive mechanism, within said housing, and upstream of said exit to said trim disposal path for cutting trim into smaller trim fragments.

5. The cutter module with an integrated trim disposal mechanism according to claim 4, wherein said trim chopping mechanism comprises a rotating blade positioned a short distance away from a stationary pinch point to form a gap through which trim can pass.

6. The cutter module with an integrated trim disposal mechanism according to claim 5, wherein said rotating blade rotates at a speed at which trim is chopped multiple times as it passes between said blade and said stationary pinch point.

7. The cutter module with an integrated trim disposal mechanism according to claim 6, further comprising a source of negative air pressure positioned downstream of said trim chopping mechanism and for sucking said trim fragments through said trim disposal path and then exhausting said trim fragments towards said exit of said trim disposal path.

8. The cutter module with an integrated trim disposal mechanism according to claim 7, wherein said trim collector comprise a trim fragment collection receptacle positioned downstream of said exit of said trim disposal path.

9. The cutter module with an integrated trim disposal mechanism according to claim 8, wherein said trim fragment collection receptacle is positioned external of said cutter housing.

10. A cutter module with integrated trim disposal capability comprising:

(a) a housing;

(b) a cutting device supported by the housing;

(c) a trim disposal system contained within the housing and comprising:

(i) a collection channel disposed downstream from the cutting device and defining an entrance to a trim disposal path;

(ii) a trim chopping mechanism disposed along the trim disposal path downstream from the entrance to the trim disposal path; and (iii) a positively-driven conveyor device disposed along the trim disposal path between the entrance to the trim disposal path and the trim chopping mechanism; and (d) a collection receptacle disposed downstream from the trim chopping mechanism.

11. The cutter module according to claim 10 wherein the conveyor device comprises at least two movable endless members defining a v-shaped profile tapering inwardly toward the trim chopping mechanism.

12. The cutter module according to claim 10 wherein the trim chopping mechanism comprises a rotating blade and a stationary member spaced from the rotating blade, wherein the rotating blade and the stationary member define a gap therebetween.

13. The cutter module according to claim 10 wherein the trim disposal system comprises a fan fluidly communicating with the trim disposal path downstream from the trim chopping mechanism.

* * * * *